(12) United States Patent
Thatcher et al.

(10) Patent No.: US 9,381,462 B2
(45) Date of Patent: Jul. 5, 2016

(54) SYSTEM AND METHOD FOR REDUCING EMISSIONS VIA SOLVENT INJECTION

(71) Applicant: General Electric Company, Schenectady, NY (US)

(72) Inventors: Robert Thomas Thatcher, Greer, SC (US); Gilbert Otto Kraemer, Greer, SC (US); Andrew Mitchell Rodwell, Greenville, SC (US); Brett Matthew Thompson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 13/932,157

(22) Filed: Jul. 1, 2013

(65) Prior Publication Data
US 2015/0000244 A1    Jan. 1, 2015

(51) Int. Cl.
| | |
|---|---|
| *F01N 3/04* | (2006.01) |
| *B01D 53/14* | (2006.01) |
| *B01D 53/86* | (2006.01) |
| *F01N 3/20* | (2006.01) |
| *F01N 5/02* | (2006.01) |
| *B01D 53/48* | (2006.01) |
| *B01D 53/54* | (2006.01) |
| *B01D 53/72* | (2006.01) |
| *B01D 53/75* | (2006.01) |

(Continued)

(52) U.S. Cl.
CPC .............. *B01D 53/14* (2013.01); *B01D 53/48* (2013.01); *B01D 53/54* (2013.01); *B01D 53/72* (2013.01); *B01D 53/75* (2013.01); *B01D 53/78* (2013.01); *B01D 53/8631* (2013.01); *F01N 3/04* (2013.01); *F01N 3/2066* (2013.01); *F01N 5/02* (2013.01); *B01D 2257/708* (2013.01); *B01D 2257/7027* (2013.01); *B01D 2258/0283* (2013.01); *F01N 13/0097* (2014.06); *F01N 2610/02* (2013.01); *Y02E 20/326* (2013.01); *Y02T 10/16* (2013.01); *Y02T 10/24* (2013.01)

(58) Field of Classification Search
CPC .... Y02C 10/04; Y02E 20/185; Y02E 20/326; F01N 3/04; B01D 53/14; B01D 53/92; B01D 2258/0283
USPC ........... 95/227, 191, 207, 230, 232, 234–237; 96/234
See application file for complete search history.

(56) References Cited

U.S. PATENT DOCUMENTS

| | | | |
|---|---|---|---|
| 7,824,636 B1 | 11/2010 | Kramer et al. | |
| 7,914,747 B1 * | 3/2011 | Kraemer | B01D 53/1456 422/170 |

(Continued)

*Primary Examiner* — Phutthiwat Wongwian
*Assistant Examiner* — Marc Amar
(74) *Attorney, Agent, or Firm* — Dority & Manning, PA

(57) ABSTRACT

A system for reducing emissions includes a gas production source that produces nitrogen oxides, sulfur oxides, hydrogen sulfide, sulfuric acid, nitric acid, formaldehyde, benzene, metal oxides, or volatile organic compound emissions. An exhaust plenum is downstream from the gas production source, and structure for dispersing a solvent is in the exhaust plenum. A collection tank is in fluid communication with the exhaust plenum to receive the solvent from the exhaust plenum, and a heat source is in the exhaust plenum downstream from the structure for dispersing the solvent. A method for reducing emissions from a gas production source includes flowing exhaust gases through an exhaust plenum, dispersing a solvent through a nozzle in the exhaust plenum, collecting the dispersed solvent in a collection tank, and heating the exhaust gases flowing through the exhaust plenum downstream from the nozzle.

18 Claims, 3 Drawing Sheets

(51) Int. Cl.
 *B01D 53/78* (2006.01)
 *F01N 13/00* (2010.01)

(56) References Cited

U.S. PATENT DOCUMENTS

| | | | | |
|---|---|---|---|---|
| 2002/0110511 A1* | 8/2002 | Klingspor | ............. | B01D 53/18 423/243.08 |
| 2008/0141646 A1* | 6/2008 | Yoshida | ................ | F01K 23/068 60/39.12 |
| 2010/0111777 A1* | 5/2010 | Klingspor | ............ | B01D 53/504 422/168 |
| 2010/0180597 A1* | 7/2010 | Kraemer | ................. | F23C 13/06 60/723 |
| 2011/0262334 A1* | 10/2011 | Kraemer | ................ | B01D 53/75 423/239.1 |
| 2013/0098049 A1* | 4/2013 | Kraemer | ................ | B01D 53/56 60/772 |

* cited by examiner

SYSTEM AND METHOD FOR REDUCING EMISSIONS VIA SOLVENT INJECTION

FIELD OF THE INVENTION

The present invention generally involves a system and method for reducing emissions. In particular embodiments, the system and method may be incorporated into a gas turbine, a boiler system, a refinery, or a combined cycle system.

BACKGROUND OF THE INVENTION

Various combustion, chemical, and/or other process systems produce byproducts that may be released to the environment as undesirable emissions. For example, gas turbines, boiler systems, refineries, and other combined cycle systems may produce exhaust gases that contain various levels of undesirable emissions such as nitrogen oxides ($NO_x$), sulfur oxides ($SO_x$), hydrogen sulfide ($H_2S$), sulfuric acid, nitric acid, formaldehyde, benzene, metal oxides, and other volatile organic compounds.

The exhaust gases are typically filtered, scrubbed, or otherwise treated to ensure that the undesirable emissions do not exceed applicable limits. For example, various additives such as ammonia or ozone may be mixed with the exhaust gases before flowing the mixture through a catalyst to remove some or all of the undesirable emissions from the exhaust gases. Although effective during normal or steady state operations, the temperature of the exhaust gases during startup or transient operations may require larger amounts of additives and/or reduce the effectiveness of the catalyst. In addition, an unsuccessful start event of the gas production source may create conditions hazardous to the environment and/or human health near the exhaust. As a result, an improved system and method for reducing emissions that does not require an additive or catalytic reaction would be useful.

BRIEF DESCRIPTION OF THE INVENTION

Aspects and advantages of the invention are set forth below in the following description, or may be obvious from the description, or may be learned through practice of the invention.

One embodiment of the present invention is a system for reducing emissions. The system includes a gas production source that produces at least one of nitrogen oxides, sulfur oxides, hydrogen sulfide, sulfuric acid, nitric acid, formaldehyde, benzene, metal oxides, or volatile organic compound emissions. An exhaust plenum is downstream from the gas production source, and the system includes means for dispersing a solvent in the exhaust plenum. A collection tank is in fluid communication with the exhaust plenum to receive the solvent from the exhaust plenum, and a heat source is in the exhaust plenum downstream from the means for dispersing the solvent in the exhaust plenum.

Another embodiment of the present invention is a system for reducing emissions that includes a combustor, a turbine downstream from the combustor, and an exhaust plenum downstream from the turbine. A nozzle in the exhaust plenum is configured to disperse a solvent in the exhaust plenum. A collection tank is in fluid communication with the exhaust plenum to receive the solvent from the exhaust plenum, and a heat source is in the exhaust plenum downstream from the nozzle.

The present invention may also include a method for reducing emissions from a gas production source that produces at least one of nitrogen oxides, sulfur oxides, hydrogen sulfide, sulfuric acid, nitric acid, formaldehyde, benzene, metal oxides, or volatile organic compound emissions. The method includes flowing exhaust gases through an exhaust plenum and dispersing a solvent through a nozzle in the exhaust plenum. The method further includes collecting the dispersed solvent in a collection tank and heating the exhaust gases flowing through the exhaust plenum downstream from the nozzle.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
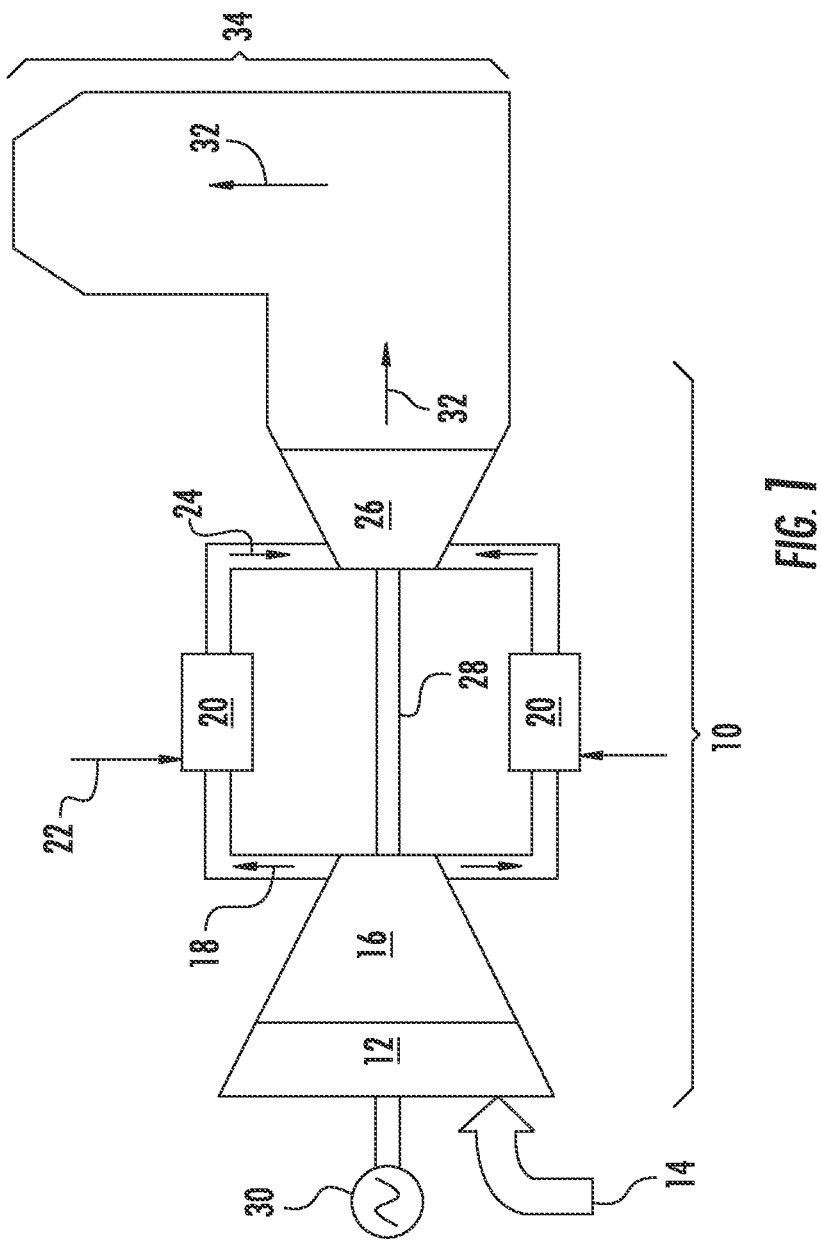
FIG. 1 is a functional block diagram of an exemplary system for reducing emissions within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system and method for reducing emissions. The system generally includes a gas production source that produces at least one of nitrogen oxides, sulfur oxides, hydrogen sulfide, sulfuric acid, nitric acid, formaldehyde, benzene, metal oxides, or volatile organic compound emissions. An exhaust plenum is downstream from the gas production source, and various means may be used to disperse a solvent in the exhaust plenum. A collection tank is in fluid communication with the exhaust plenum to receive the solvent from the exhaust plenum, and a heat source is in the exhaust plenum downstream from the means for dispersing the solvent in the exhaust plenum to enable plume lofting. Although the gas production source is a combined cycle gas turbine in the exemplary embodiment described herein, one of ordinary skill in the art will readily appreciate from the teachings herein that in alternate embodiments the gas production source may be a single cycle gas turbine, a boiler system, a refinery, or any other system that produces undesirable emissions that can be subsequently processed by time-shifting for readmission into the system.

Referring now to the drawings, wherein identical numerals indicate the same elements throughout the figures, FIG. 1 provides a functional block diagram of an exemplary system for reducing emissions within the scope of various embodiments of the present invention. In this exemplary embodiment, the system is a combined cycle gas turbine 10, although the present invention is not limited to a combined cycle gas turbine unless specifically recited in the claims. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state. The compressed working fluid 18 flows to a combustion section where one or more combustors 20 ignite fuel 22 with the compressed working fluid 18 to produce combustion gases 24 having a high temperature and pressure. The combustion gases 24 flow through a turbine section to produce work. For example, a turbine 26 may connect to a shaft 28 so that rotation of the turbine 26 drives the compressor 16 to produce the compressed working fluid 18. Alternately or in addition, the shaft 28 may connect the turbine 26 to a generator 30 for producing electricity. Exhaust gases 32 from the turbine 26 flow through an exhaust section 34 that extract additional work from and treat the exhaust gases 32 before release to the environment.

Figure 2:
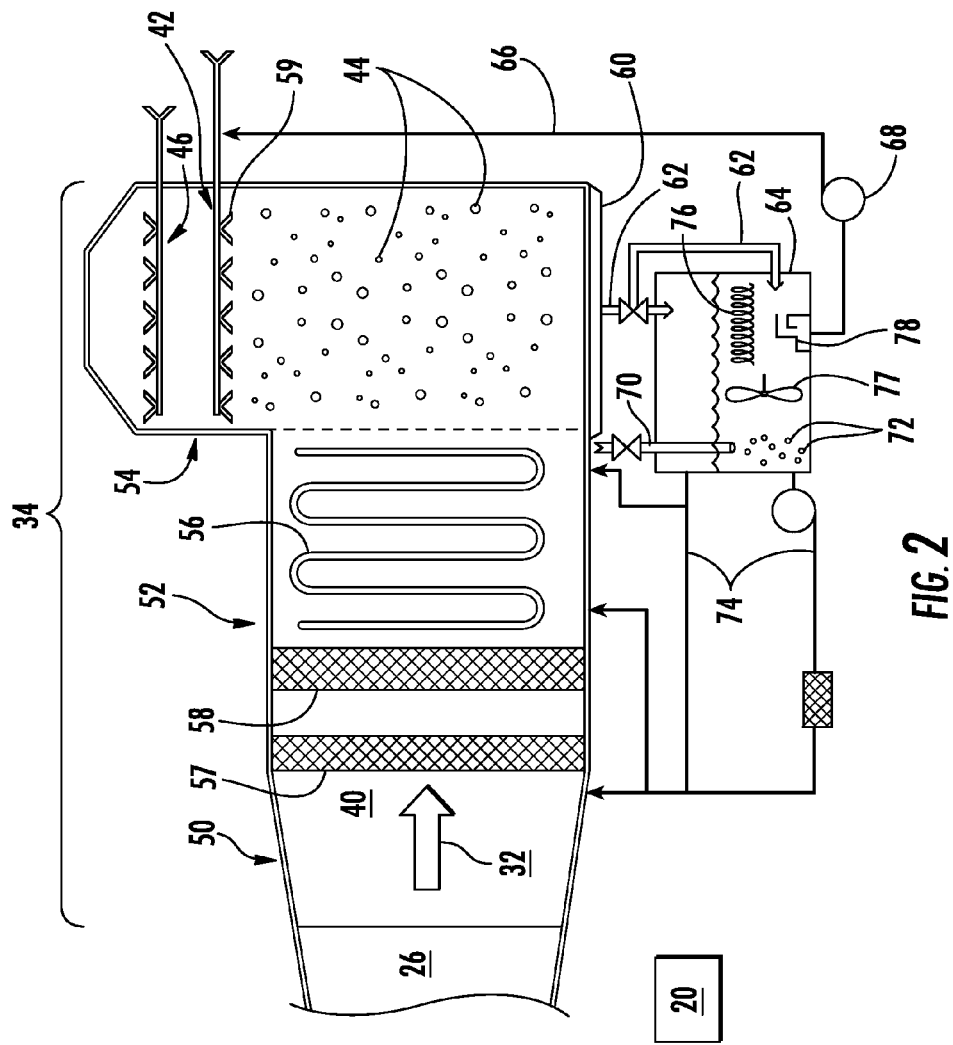
FIG. 2 is a functional block diagram of the exhaust section of the combined cycle gas turbine shown in FIG. 1 according to one embodiment of the present invention.

FIG. 2 provides a functional block diagram of the exhaust section 34 of the combined cycle gas turbine 10 shown in FIG. 1 according to one embodiment of the present invention. As shown, the exhaust section 34 may include, for example, an exhaust plenum 40, means 42 for dispersing a solvent 44 in the exhaust plenum 40, and a heat source 46. The exhaust plenum 40 is downstream from the gas production source and contains the exhaust gases 32 exiting the turbine 26 before release to the environment. In particular embodiments, the exhaust plenum 40 may include a diffuser portion 50, a heat exchanger portion 52 and a stack portion 54. The diffuser portion 50 has a gradually increasing cross-sectional area to decrease the velocity and increase the static pressure of the exhaust gases 32, converting the kinetic energy of the exhaust gases 32 into potential energy. The heat exchanger portion 52 is generally downstream from the diffuser portion 50 and may include a steam generator or other heat exchanger 56 to extract additional thermal energy from the exhaust gases 32 prior to discharge to the environment. In addition, the heat exchanger portion 52 may include an ammonia injection grid 57 upstream from a catalytic converter 58, such as a selective catalytic reduction (SCR) catalyst, to remove undesirable emissions from the exhaust gases 32 during normal or steady-state operations. The stack portion 54 is generally the downstream-most portion of the exhaust plenum 40 and facilitates final scrubbing or filtering of the exhaust gases 32 prior to discharge to the environment.

The means 42 for dispersing the solvent 44 in the exhaust plenum 34 may be located downstream from the heat exchanger portion 52; however, the particular location of the means 42 is not a limitation of the present invention unless recited in the claims. The function of the means 42 is to disperse, atomize, spray, shower, or otherwise distribute the solvent 44 inside the exhaust plenum 40 to enhance absorption of the various emissions into the solvent 44. As used herein, solvent 44 includes both aqueous, non-aqueous, and organic solvents. The structure associated with the means 42 may include, for example, a nozzle 59, a spray ring, or equivalent structure known to one of ordinary skill in the art for dispersing, atomizing, spraying, showering, or otherwise distributing the solvent 44 inside the exhaust plenum 40. As the exhaust gases 32 mix with the dispersed solvent 44, the solvent 44 absorbs into solution one or more of the undesirable emissions included in the exhaust gases 32. In this manner, the solvent 44 may be used to scrub or clean the exhaust gases 32 during startup or transient conditions when the reduced temperature of the exhaust gases 32 would otherwise require larger amounts of additives and/or reduce the effectiveness of the catalytic converter 58 normally used to remove undesirable emissions from the exhaust gases 32.

The interaction between the solvent 44 and the exhaust gases 32 may reduce the thermal driving head of the exhaust gases 32 out of the stack portion 54 of the exhaust plenum 40. As a result, the heat source 46 may increase the temperature of the exhaust gases 32 to enable plume lifting by restoring sufficient thermal driving head to the exhaust gases 32 flowing out of the stack portion 54. The heat source 46 may be one or more burners, steam ducts, resistance heaters, or other suitable devices known to one of ordinary skill in the art. In addition, the heat source 46 may be located downstream from the means 42 for dispersing the solvent 44 in the exhaust plenum 40 or at any other suitable location in the exhaust plenum 40.

The solvent 44 may condense or collect in a gravity sump 60 at low points in the exhaust plenum 40, and piping 62 may connect the gravity sump 60 to a collection tank 64. In this manner, the collection tank 64 may be in fluid communication with the exhaust plenum 40 to receive and collect the solvent 44 containing dissolved emissions from the exhaust plenum 40. As shown in FIG. 2, the piping 62 may connect to the top of the collection tank 64 to enhance release of the emissions from the solvent 44 in the collection tank 64. Alternately, the piping 62 may connect to the bottom of the collection tank 64 to reduce release of the emissions in the collection tank 64 until such time that the emissions may be further processed. A recirculation path 66 may connect the collection tank 64 to the means 42 for dispersing the solvent 44 in the exhaust plenum 40, and a pump 68 may pressurize and supply the contents of the collection tank 64 to the means 42. In this manner, the solvent 44 may be recirculated between the collection tank 64 and the exhaust plenum 40 as necessary to remove undesirable emissions from the exhaust gases 32 while reducing the consumption of solvent 44.

In particular embodiments, the system may include various optional features to condition the solvent 44 in the collection tank 64 prior to recirculating the solvent 44 through the exhaust plenum 40 and/or disposing of the emissions-saturated solvent 44 that accumulates in the collection tank 64. For example, as shown in FIG. 2, a sparge pipe 70 in fluid communication with the collection tank 64 may percolate a gaseous fluid 72, such as air, through the solvent 44 in the collection tank 64 to strip the dissolved emissions out of solution in the solvent 44. Piping 74 may provide fluid communication between the collection tank 64 and various locations in the exhaust plenum 40 or gas turbine 10 to process the emissions-saturated solvent 44 by re-injecting it at various locations in the exhaust plenum 40 or gas turbine 10. For example, the piping 74 may connect to the combustors 20 so that emissions-saturated solvent 44 containing hydrogen sulfide and/or formaldehyde may be processed through combustion. Alternately, when the temperature of the exhaust gases 32 has increased sufficiently, the sparge gas 72 and/or the emissions-saturated solvent 44 from the collection tank 64 may flow back to the exhaust plenum 40 upstream from the ammonia injection grid 57 and/or catalytic converter 58 to mix with the exhaust gases 32 flowing through the exhaust plenum 40 from the turbine 26. The catalytic converter 58 may then remove undesirable emissions such as nitrogen oxides from the exhaust gases 32, sparge gas 72, and/or solvent 44, returning any rejuvenated solvent 44 to the gravity sump 60 and/or collection tank 64. Alternately, the relatively cooler sparge gas 72 and/or solvent 44 may flow to the exhaust plenum 40 upstream or downstream from the heat exchanger 56 to facilitate faster startup of the gas turbine 10 and/or heat exchanger 56. For example, flowing the relatively cooler sparge gas 72 and/or solvent 44 into the exhaust plenum 40 upstream from the heat exchanger 56 may allow faster heat up of the gas turbine 10 without exceeding temperature limits associated with the heat exchanger 56. Alternately, flowing the relatively cooler sparge gas 72 and/or solvent 44 into the exhaust plenum 40 downstream from the heat exchanger 56 may allow faster startup of the heat exchanger 56 in concert with the gas turbine 10.

Additional optional features may be included to further condition the solvent 44 prior to recirculation through the exhaust plenum 40 and/or disposal of the emissions-saturated solvent 44. For example, the system may include additional optional features to change the temperature, pressure, and/or agitation of the solvent 44 to produce a corresponding change in the solubility and/or release rate of emissions in the solvent 44. In the particular embodiment shown in FIG. 2, for example, a heater 76 located inside the collection tank 64 may be used to increase the temperature of the solvent 44 and change the solubility of the solvent 44 before the solvent 44 is either recirculated through the exhaust plenum 40 or disposed of through the piping 74. In alternate embodiments, the heater 76 may surround the collection tank 64, or the solvent 44 may be circulated through a heat exchanger (not shown) located outside of the collection tank 64.

An impeller 77 inside the collection tank 64 may be used to agitate and/or mix the solvent 44 in the collection tank 64. Agitation may help to either strip emissions from the solvent 44 or enhance uniformity in the solvent 44 prior to recirculating the solvent 44 through the exhaust plenum 40. One or more circulating pumps, flocculators, or other devices known to one of ordinary skill in the art may be installed inside the collection tank 64 in place of the impeller 77 to agitate the solvent 44 in the collection tank 64. Alternately or in addition, in still further embodiments, the collection tank 64 may include one or more separating panels or other baffles 78 to reduce agitation and/or mixing of the solvent 44 inside the collection tank 64. In this manner, the baffles 78 may reduce removal of the emissions from the solvent 44 until further disposition of the emissions and/or solvent 44 is available.

Figure 3:
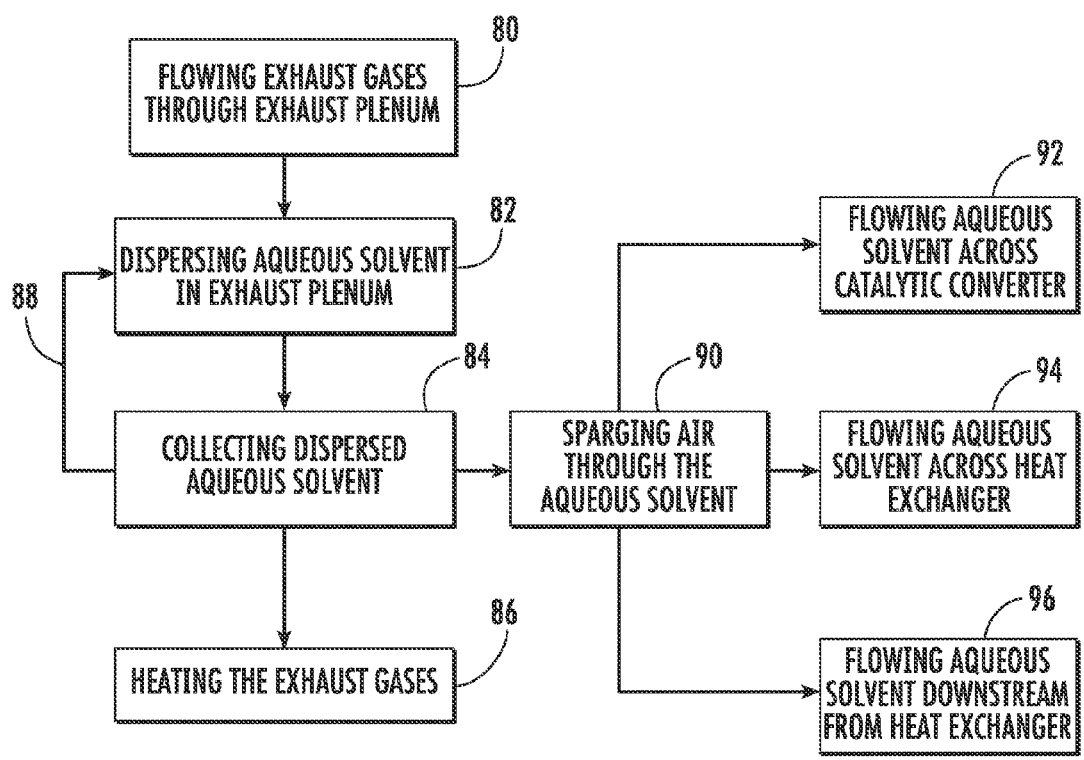
FIG. 3 is an exemplary block diagram of a method for reducing emissions according to one embodiment of the present invention.

One of ordinary skill in the art will readily appreciate from the teachings herein that the system described and illustrated in FIGS. 1 and 2 may also provide a method for reducing emissions, and FIG. 3 provides an exemplary block diagram of an exemplary method according to one embodiment of the present invention. The method may include flowing the emissions-containing exhaust gases 32 through the exhaust plenum 40, indicated by block 80. At block 82, the method may include dispersing the solvent 44 through the nozzle 59 in the exhaust plenum 40 so that the solvent 44 may mix with the exhaust gases 32 and absorb the undesirable emissions. The method may further include collecting the dispersed solvent 44 in the collection tank 64, indicated by block 84, and heating the exhaust gases flowing through the exhaust plenum 40 downstream from the nozzle 59, indicated by block 86.

In particular embodiments, the method may include flowing the solvent 44 from the collection tank 64 through the recirculation path 66 to the nozzle 59 in the exhaust plenum 40, indicated by line 88, to reduce consumption of the solvent 44. Alternately or in addition, the method may include sparging air 90 through the solvent 44 to strip emissions out of solution with the solvent 44. The sparge air 72 and/or solvent 44 may then be flowed across the catalytic converter 58 once the temperature of the exhaust gases is sufficient, indicated by block 92. Alternately or in addition, the method may include flowing the solvent 44 across or downstream from the heat exchanger 56, indicated by blocks 94 and 96, respectively.

The systems and methods described herein may thus provide a cost-effective solution for reducing emissions during startup conditions when the temperature of the exhaust gases 32 may be less than optimum for existing systems and methods. In addition, the systems and methods may be readily installed in both new and existing gas production sources to facilitate compliance with emissions limits during a wide range of operating conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for reducing emissions, comprising:
   a gas turbine that produces an exhaust gas comprising at least one of nitrogen oxides, sulfur oxides, hydrogen sulfide, sulfuric acid, nitric acid, formaldehyde, benzene, metal oxides, or volatile organic compound emissions;
   an exhaust plenum downstream from the gas turbine wherein the exhaust plenum receives the exhaust gas from the gas turbine;
   means for dispersing a solvent in the exhaust plenum;
   a collection tank in fluid communication with the exhaust plenum to
   receive the solvent from the exhaust plenum;
   a heat source in the exhaust plenum downstream from the means for dispersing the solvent in the exhaust plenum;
   a reduction catalytic converter located downstream from the turbine and upstream of the means for dispersing solvent;
   an ammonia injection grid disposed upstream of the reduction catalytic convertor; and
   wherein the exhaust plenum includes an exhaust stack portion that extends vertically upwardly and is vented to the environment, wherein the exhaust gases flow vertically upwardly through the exhaust stack portion and wherein the means for dispersing a solvent in the exhaust plenum is disposed within the exhaust stack portion proximate to an outlet of the exhaust stack portion to inject solvent radially inward towards exhaust gas.

2. The system as in claim 1, further comprising a recirculation path between the collection tank and the means for dispersing the solvent in the exhaust plenum.

3. The system as in claim 1, further comprising a sparge pipe in fluid communication with the collection tank.

4. The system as in claim 1, wherein the reduction catalytic converter is disposed between the ammonia injection grid and the collectin tank.

5. The system as in claim 1, further comprising a heat exchanger disposed within the exhaust plenum and a fluid conduit that defines a flow path between the collection tank and the exhaust plenum, wherein the fluid conduit is fluidly connected to the exhaust plenum at a location that is upstream from the heat exchanger.

6. The system as in claim 1, further comprising a heat exchanger disposed within the exhaust plenum and a fluid conduit that defines a flow path between the collection tank and the exhaust plenum, wherein the fluid conduit is fluidly connected to the exhaust plenum at a location that is downstream from the heat exchanger.

7. The system as in claim 1, further comprising at least one of an impeller, a heater, or a baffle inside the collection tank.

8. A system for reducing emissions from a gas turbine, the system comprising:
   a compressor;
   a plurality of combustors disposed downstream from the compressor, wherein the plurality of combustors produce an exhaust gas comprising at least one of nitrogen oxides, sulfur oxides, hydrogen sulfide, sulfuric acid, nitric acid, formaldehyde, benzene, metal oxides, or volatile organic compound emissions;
   a turbine downstream from the plurality of combustors, wherein the exhaust gas flows from the plurality of combustors and through the turbine;
   an exhaust plenum downstream from the turbine, wherein the exhaust plenum receives the exhaust gas from the turbine;
   a nozzle in the exhaust plenum, wherein the nozzle is configured to disperse a solvent in the exhaust plenum;
   a collection tank in fluid communication with the exhaust plenum to receive the solvent from the exhaust plenum;
   a heat source in the exhaust plenum downstream from the nozzle;
   a reduction catalytic converter located upstream from the nozzle; and
   wherein the exhaust plenum includes an exhaust stack portion that extends vertically upwardly and is vented to the environment, wherein the exhaust gases flow vertically upwardly through the exhaust stack portion and wherein the nozzle is disposed within the exhaust stack portion proximate to an outlet of the exhaust stack portion to inject solvent radially inward towards exhaust gas.

9. The system as in claim 8, further comprising a recirculation path between the collection tank and the nozzle.

10. The system as in claim 8, further comprising a sparge pipe in fluid communication with the collection tank.

11. The system as in claim 8, further an ammonia injection grid disposed upstream of the reduction catalytic convertor in the exhaust plenum.

12. The system as in claim 8, further comprising a heat exchanger disposed within the exhaust plenum and a fluid conduit that defines a flow path between the collection tank and the exhaust plenum, wherein the fluid conduit is fluidly connected to the exhaust plenum at a location that is upstream from the heat exchanger.

13. The system as in claim 8, further comprising a heat exchanger disposed within the exhaust plenum and a fluid conduit that defines a flow path between the collection tank and the exhaust plenum, wherein the fluid conduit is fluidly connected to the exhaust plenum at a location that is downstream from the heat exchanger.

14. A method for reducing emissions from a gas turbine that produces an exhaust gas comprising at least one of nitrogen oxides, sulfur oxides, hydrogen sulfide, sulfuric acid, nitric acid, formaldehyde, benzene, metal oxides, or volatile organic compound emissions, the method comprising:
   flowing the exhaust gases from the gas turbine through an exhaust plenum;
   flowing the exhaust gasses across an ammonia injection grid disposed within the exhaust plenum;
   flowing the exhaust gases from the ammonia injection grid across a reduction catalytic converter located within the exhaust plenum located downstream from the ammonia injection grid;
   dispersing a solvent through a nozzle into the flow of the exhaust gasses exiting the ammonia injection grid within the exhaust plenum;
   collecting the dispersed solvent in a collection tank;
   heating the exhaust gasses flowing through the exhaust plenum downstream from the nozzle upstream from an outlet to the exhaust plenum; and
   wherein the exhaust plenum includes an exhaust stack portion that extends vertically upwardly and is vented to the environment, wherein the exhaust gases flow vertically upwardly through the exhaust stack portion and wherein the nozzle is disposed within the exhaust stack portion proximate to an outlet of the exhaust stack portion to inject solvent radially inward towards exhaust gas.

15. The method as in claim 14, further comprising flowing the solvent from the collection tank through a recirculation path to the nozzle in the exhaust plenum.

16. The method as in claim 14, further comprising sparging air through the collection tank.

17. The method as in claim 14, further comprising flowing the solvent from the collection tank across a heat exchanger in the exhaust plenum.

18. The method as in claim 14, further comprising flowing the solvent from the collection tank into the exhaust plenum downstream from a heat exchanger in the exhaust plenum.

\* \* \* \* \*